US009377783B2

(12) United States Patent
Riedinger et al.

(10) Patent No.: US 9,377,783 B2
(45) Date of Patent: Jun. 28, 2016

(54) METHOD FOR SECURING A GROUND SPEED USED AN ALGORITHM FOR GUIDING LANDING OF AN AIRCRAFT, ASSOCIATED COMPUTER PROGRAM AND DEVICE

(71) Applicant: THALES, Neuilly sur Seine (FR)

(72) Inventors: Marc Riedinger, Toulouse (FR); Sylvain Lissajoux, Toulouse (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/592,262

(22) Filed: Jan. 8, 2015

(65) Prior Publication Data
US 2015/0198954 A1    Jul. 16, 2015

(30) Foreign Application Priority Data

Jan. 10, 2014  (FR) ...................................... 14 00052

(51) Int. Cl.
| G05D 1/06 | (2006.01) |
| G08G 5/00 | (2006.01) |
| G01C 23/00 | (2006.01) |
| G08G 5/02 | (2006.01) |

(52) U.S. Cl.
CPC .............. *G05D 1/0676* (2013.01); *G01C 23/00* (2013.01); *G08G 5/0021* (2013.01); *G08G 5/025* (2013.01)

(58) Field of Classification Search
CPC . G05D 1/0607; G05D 1/0676; G08G 5/0047; G01C 23/00
USPC ............ 701/3–5, 8, 11, 16–18; 244/183, 185, 244/187; 342/33–35
See application file for complete search history.

(56) References Cited

U.S. PATENT DOCUMENTS

| 3,149,226 A | * | 9/1964 | Campbell | ................. G01S 1/02 342/411 |
| 3,743,221 A | * | 7/1973 | Lykken | ................ G05D 1/0676 244/180 |
| 3,892,373 A | * | 7/1975 | Doniger | ............... G05D 1/0676 244/186 |
| 4,354,237 A | * | 10/1982 | Lambregts | ........... G05D 1/0676 244/183 |

(Continued)

FOREIGN PATENT DOCUMENTS

EP          0 034 874        9/1981

OTHER PUBLICATIONS

French Search Report dated Dec. 4, 2014, which issued during prosecution of French Application No. 1400052.

*Primary Examiner* — Thomas Tarcza
*Assistant Examiner* — Tyler J Lee
(74) *Attorney, Agent, or Firm* — Troutman Sanders LLP

(57) ABSTRACT

A method for securing a ground speed used for guiding landing of an aircraft by determining a ground speed of the aircraft and determining a landing guidance instruction based on the determined ground speed. Next, estimate the vertical speed of the aircraft and limit, during guidance along a glide path having a descent angle, the determined ground speed as a function of the estimated vertical speed. The guidance instruction is based on the limited ground speed. Further, measure the height of the aircraft and compare it with a threshold height. If the measured height is greater than the threshold height, limit the ground speed as a function of acceleration measurements. If the measured height is below the threshold height, limiting the ground speed as a function of the estimated vertical speed and as a function of acceleration measurements of the aircraft taken once threshold height has been crossed.

15 Claims, 2 Drawing Sheets

(56) References Cited

U.S. PATENT DOCUMENTS

| | | | |
|---|---|---|---|
| 4,357,661 A | 11/1982 | Lambregts et al. | |
| 4,413,320 A * | 11/1983 | Brandau | G05D 1/0676 244/183 |
| 5,020,747 A | 6/1991 | Orgun et al. | |
| 5,260,702 A * | 11/1993 | Thompson | G01C 5/005 244/180 |
| 6,154,693 A * | 11/2000 | Aberschitz | G01S 5/0054 701/120 |
| 6,158,695 A * | 12/2000 | Najmabadi | B64C 13/16 244/183 |
| 6,492,934 B1 | 12/2002 | Hwang et al. | |
| 8,831,799 B1 * | 9/2014 | Levine | G05D 1/0676 244/183 |
| 2011/0106345 A1 | 5/2011 | Takacs et al. | |

\* cited by examiner

METHOD FOR SECURING A GROUND SPEED USED AN ALGORITHM FOR GUIDING LANDING OF AN AIRCRAFT, ASSOCIATED COMPUTER PROGRAM AND DEVICE

CROSS REFERENCE TO RELATED APPLICATION

The present application claims priority to French Patent Application No. 14 00052 filed Jan. 10, 2014, which is herein incorporated by reference in its entirety.

FIELD OF THE INVENTION

The present invention relates to a method for securing a ground speed used in an algorithm for guiding landing of an aircraft, comprising the following steps:
  determining a ground speed of the aircraft;
  using a computer to determine at least one landing guidance instruction based on at least said determined ground speed of the aircraft.

BACKGROUND

The landing guidance functions provide assistance to aircraft pilots in landing under reduced visibility conditions making visual references insufficient to perform a traditional manual landing. They in particular comprise an automatic landing function that automatically controls the aircraft based on the predetermined guidance instructions and/or a display function on a crosshairs indicating an instruction to the pilot allowing him to pilot his aircraft manually with few outside visual references.

Only two types of sensors deliver the ground speed (Vsol) of the aircraft during flight, in particular during the landing guidance phase: the inertial units and the satellite navigation receivers.

The algorithms that calculate the guidance instructions generally use that speed of the aircraft relative to the ground, which makes the use of that datum critical. In fact, the loss of that speed Vsol or an undetected error in that speed Vsol may lead to guiding the aircraft outside the area where it must land, which can be fatal for the aircraft. It is therefore necessary to secure that ground speed datum by confirming its accuracy or the presence of an error.

It is known to secure the ground speed by comparing the measurements Vsol provided by at least two independent inertial units onboard the aircraft. This solution is nevertheless expensive, because it requires the installation of at least two inertial units.

As a reminder, an inertial unit, also called IRS (Inertial Reference System), generally comprises three rate gyros measuring the three components of the angular speed vector (roll, pitch and yaw speeds) and three accelerometers measuring the three acceleration components. The IRS is suitable for a precise calculation, by measurement integration, of the attitude angles (roll, pitch and heading), the ground speed and vertical speed components, and the position of the aircraft.

One alternative to using two IRS's to calculate and secure the speed Vsol is to use a satellite navigation receiver, also called GNSS (Global Navigation Satellite System), in place of an IRS or a set of IRS's. The issue then arises of the integrity and availability of the satellite data, in particular at low radio altitude. Furthermore, the redundancy of the satellites onboard the aircraft does not make it possible to offset the problem of unavailability of the satellite signals themselves.

There is therefore a need to secure the measurement of an aircraft's ground speed taken into account during landing guidance, reliably and while limiting the necessary investments.

SUMMARY

To that end, according to a first aspect, the invention proposes a method for securing a ground speed used in an aircraft landing guidance algorithm of the aforementioned type, characterized in that it further comprises:
  a step for estimating the vertical speed of the aircraft;
    during guidance along a glide path describing a given descent angle, a step for limiting said determined ground speed of the aircraft as a function of the estimated vertical speed;
  the guidance instruction being determined based on said limited ground speed.

Such a method makes it possible to secure the ground speed from a non-duplicated sensor or a sensor whose availability is uncertain, such that a loss or error of that ground speed does not result in guiding the aircraft toward a catastrophic situation during landing under automatic landing conditions.

The invention makes it possible to secure the determination of the aircraft's ground speed using a method that does not require redundancy in the aircraft of the sensor delivering that ground speed to the aircraft and that makes it possible to use one or more GNSS's to deliver the ground speed despite any unavailability of those systems at low radio altitudes.

The invention is particularly useful at low heights, typically below 200 feet, along the final trajectory on the glide path slope, during the flare (transition that leads the aircraft to touch down) and rolling on the runway.

In embodiments, the aircraft landing guidance method according to the invention further comprises one or more of the following features:
  the ground speed is limited as a function of a ratio between said estimated vertical speed and $\tan(\gamma)$, where the angle $\gamma$ has a value comprised in the range between 2° and 10°, preferably in a range from 2.5 to 3.5°;
  the ground speed is limited as a function of a ratio between said estimated vertical speed and the tangent of the descent angle of the glide path;
  said limited ground speed is equal to the median of the set comprising the determined ground speed, the result of the sum of said ratio and a first, positive constant, and the result of the sum of said ratio and a second, negative constant;
  the method further comprises a measurement of the height of the aircraft and a step for comparing the measured height of the aircraft with a threshold height;
  and if the measured height is greater than the threshold height, the limitation of the ground speed depends on a ground speed of the aircraft determined as a function of acceleration measurements done by a first sensor of the aircraft;
  and if the measured height is below the threshold height, the limitation of the ground speed depends on a ground speed of the aircraft determined as a function of acceleration measurements of the aircraft taken once threshold height has been crossed by a second sensor separate from the first sensor, excluding any measurement taken once the threshold height has been crossed by the first sensor separate from the first sensor, and further as a function of the ground speed of the aircraft as limited in a step for limiting a ground speed of the aircraft before crossing the threshold height determined as a function of aircraft measurements taken by said first acceleration sensor;

the precision level of the determination of the aircraft's ground speed by the first sensor is higher than the precision level of the determination of the aircraft's ground speed by the second sensor, and the aircraft further comprises a third sensor similar to the second sensor such that the accuracy of said aircraft acceleration measurements done by the second sensor is validated based on acceleration measurements done by the third sensor.

According to a second aspect, the present invention proposes a computer program that can be installed in a landing guidance device of an aircraft, said program comprising instructions for carrying out the steps of the method according to the first aspect of the invention when the program is run by the processing means of said landing guidance device.

According to a third aspect, the present invention proposes a landing guidance device for an aircraft, said device being suitable for determining a ground speed of the aircraft and at least one landing guidance instruction as a function of said at least one determined ground speed;

said device being characterized in that it is further suitable for estimating the vertical speed of the aircraft and, during guidance along a glide path describing a given descent angle, limiting said determined ground speed of the aircraft as a function of the estimated vertical speed;

said device being suitable for determining the guidance instruction as a function of said limited ground speed.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 1:
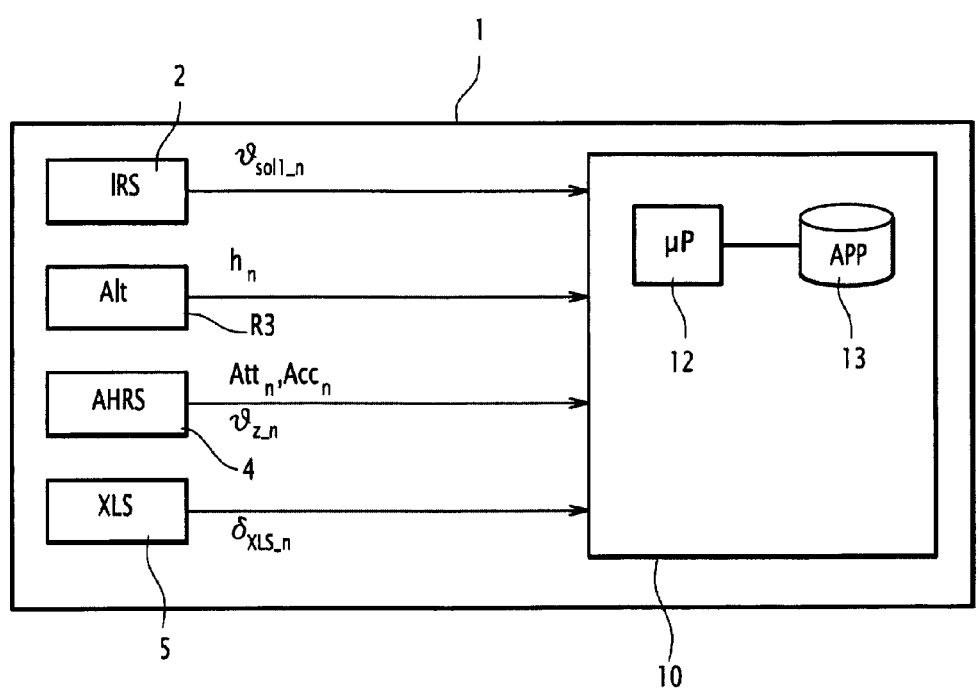
FIG. 1 shows a partial view of an aircraft comprising a landing guidance device in one embodiment of the invention.

FIG. 1 shows a partial view of an aircraft in one embodiment of the invention.

The aircraft 1 comprises a guidance device 10, comprising a microprocessor 12 and a memory 13.

This guidance device 10 is suitable for developing landing guidance instructions for the aircraft.

The memory 13 in particular stores software instructions in an application APP.

Depending on the embodiments, these landing guidance instructions are carried out by the automatic pilot responsible for performing the landing, and/or are displayed on guidance crosshairs of the piloting station intended for the pilot.

These guidance instructions for example comprise instructions to be applied allowing the aircraft to touch down in a predefined location on the runway. These instructions are for example of the following type:

speed vector, pitch and/or incline instructions of the airplane.

The airplane 1 further comprises a sensor 2, in the case at hand an inertial unit 2, suitable for computing the ground speed $v_{sol1\_n}$ of the aircraft 1, during flight and during the landing phase, by incorporating accelerations measured by its rate gyros and accelerometers since takeoff, and for providing the guidance device 10 with those speeds computed at each moment $t_n$ of a plurality of computation moments ($t_n$=t0+n Δt, with n a positive integer).

The ground speed of the aircraft, in that reference relative to the ground, is the component of the aircraft's speed in the plane (X, Y) perpendicular to the axis Z.

The aircraft 1 further comprises a radio altimeter R3 suitable for estimating the radio altitude of the aircraft 2 on the axis Z. The radio altimeter R3 [is] suitable for computing the radio altitude $h_n$ and providing the guidance device 10 with that radio altitude at each moment $t_n$.

The radio altitude is the height below the airplane measured relative to the terrain using waves reflected by the ground.

The aircraft 1 further comprises a primary reference unit 4, in the case at hand an attitude and heading reference system 4, or AHRS 4, which comprises rate gyros and accelerometers on 3 axes and in particular computes the primary reference data such as the attitude angles $Att_n$ (roll, pitch and heading) and the accelerations $Acc_n$ of the aircraft at each moment $t_n$. The AHRS 4 is further suitable for determining the vertical speed $v_{z\_n}$ of the aircraft at each moment $t_n$.

The precision of these reference data measured by the AHRS 4 is not sufficient for them to be used as a basis for the continuous computation of the ground speed throughout landing, unlike the IRS 2.

However, the primary reference unit 4 is of the duplicated type, in that the processors, rate gyros and accelerometers are doubled therein, the accuracy of each measurement by a rate gyro, an accelerometer, respectively, along an axis for a moment t being verified, by comparison and/or combination with a measurement done by another rate gyro, accelerometer, respectively, of the unit along that same axis for the moment t.

These reference data $Att_n$ and $Acc_n$ thus verified and $v_{z\_n}$ are provided to the guidance device 10 at each moment $t_n$.

The vertical speed of the aircraft, in a reference related to the ground, refers to the component of the speed of the aircraft 1 on an axis Z passing through the center of the earth and through the center of gravity of the aircraft 1.

It will be noted that the vertical speed determined by the AHRS 4 is of the baro-inertial type: it is a hybridization of the data measured by the accelerometers with a first vertical speed computed by a sensor, called Air Data Unit. The Air Data Unit (ADU) measures the variations in atmospheric pressure and deduces a vertical speed in the air mass therefrom, according to a known pressure gradient. The hybridization makes it possible to reduce errors due to turbulence in the air.

The aircraft further comprises a module 5 for computing a deviation relative to the glide path, hereinafter referred to as the XLS module 5, computing, as a function of signals emitted by beacon transmitters, the trajectory deviations $\delta_n$, at each moment $t_n$, of the aircraft 2 relative to the slope of the glide path assigned to it for the landing phase.

The glide path is characterized by its slope describing an angle γ relative to the plane (X, Y).

These trajectory deviations $\delta_n$, are provided to the guidance device 10 at each moment $t_n$. The provision of these deviations allows the auto-enslavement of the aircraft's descent on the slope with angle γ, the guidance device 10 determining its guidance instructions in the glide path based on those deviations.

The technology of the module 5 for computing a deviation relative to the glide path is for example of the ILS (Instrument Landing System), MLS (Microwave Landing System), GLS (GPS Landing System), etc. type.

Thus in the case at hand, the sensor 2 is not duplicated by a sensor with similar technology.

The present invention proposes a solution for nevertheless securing the computation of the ground speed during the landing phase of the aircraft comprising a descent portion along a glide path with a fixed slope γ, a rolling portion on the ground and a flare portion forming the junction between the descent portion and touchdown of the aircraft's wheels on the ground.

This solution is based on two principles:

along the glide path until the beginning of the flare portion, the ground speed used to compute the guidance instruction is limited as a function of $v_{z\_n}/\tan \gamma$;

above a threshold radio altitude H (typically, H is comprised between 60 and 200 feet), the ground speed used to compute the guidance instruction depends on the current ground speed from the IRS 2 at the current moment $t_n$; and below the threshold radio altitude H, the current ground speed from the IRS 2 is no longer used to compute the guidance instruction; the guidance device 10 uses, in place of the latter to determine the guidance instruction, an estimate of the ground speed of the aircraft computed by integrating acceleration values delivered by the AHRS unit 4, taking into account an initialization value of the ground speed equal to the ground value computed when the threshold radio altitude is passed.

Figure 2:
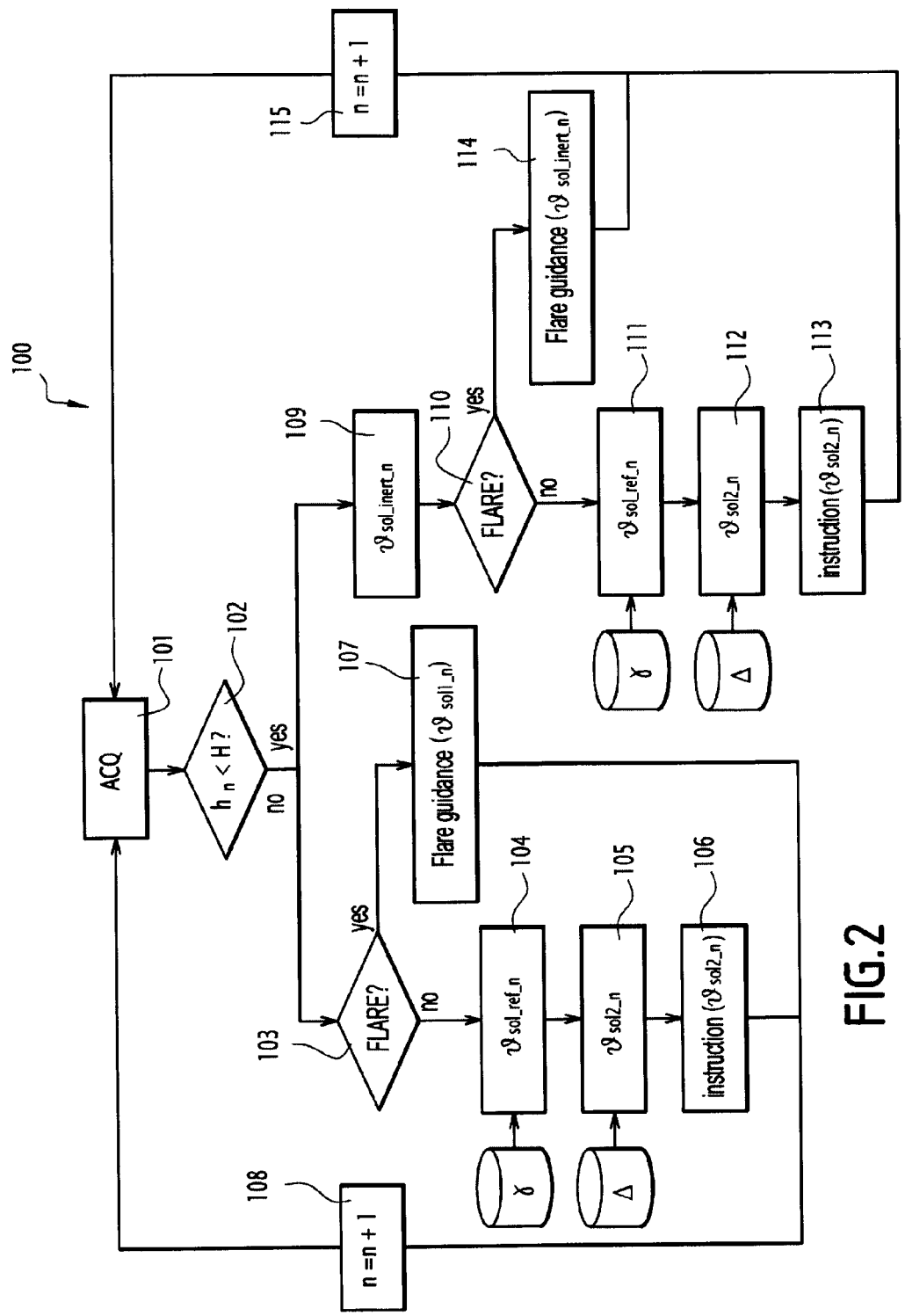
FIG. 2 is a flowchart of steps of a landing guidance method for an aircraft in one embodiment of the invention.

The application APP of the guidance device 10 is suitable, when executed by the microprocessor 12, for carrying out, in a reiterated manner, the steps of a method 100 that are indicated below in reference to FIG. 2 along the final trajectory, typically below 200 feet, i.e., on the slope of the glide path, during the flare (transition that leads the airplane to touch down) and the rolling on the runway.

The process 100 is a real-time process, reiterated at each moment $t_n$ ($t_n = t0 + n \Delta t$, with n a positive integer).

In a data acquisition step 101, the guidance device 10 collects the data $h_n$, $v_{sol1\_n}$, $v_{z\_n}$, $\delta_n$, $Att_n$ and $Acc_n$, as computed for the moment $t_n$.

In a step 102, the collected radio altitude $h_n$ is compared to a height H that is a minimum usage height for the ground speed data provided by the IRS sensor 2.

The height H is set between 60 feet and 200 feet, depending on the quality of the accelerations provided by the AHRS 4. It is for example predetermined by analyzing the criticality of the landing guidance breakdowns and for example depends on the type of aircraft. In one embodiment, it is determined following landing guidance simulations of the aircraft.

It is considered that above the radio altitude H, the satellite masking risk is not high on the one hand, and on the other hand, the radio altitude is sufficient to allow the pilot to cancel the landing and overshoot. The ground speed datum $v_{sol1\_n}$ provided by the sensor 2 can therefore be used.

If in step 102, the radio altitude $h_n$ is determined to be greater than the height H, step 103 is carried out.

Step 103 tests whether the flare conditions are met.

The flare conditions test whether the aircraft is in the flare portion of the landing phase.

These flare conditions depend on the height $h_n$, and optionally the ground speed $v_{sol1\_n}$ and/or the vertical speed $v_{z\_n}$ (the flare typically takes place when the radio altitude of the aircraft drops below 50 feet).

If the conditions tested in step 103 are not met, in step 104, a reference ground speed of the aircraft is then estimated, called $v_{sol\_ref\_n}$, as a function of the angle γ between the glide path and the plane (X, Y) and as a function of the vertical speed of the aircraft $v_{z\_n}$.

In the case at hand: $v_{sol\_ref\_n} = v_{z\_n}/\tan(\gamma)$, where tan designates the "tangent" function.

In step 105, the ground speed $v_{sol1\_n}$ is limited by a maximum value and minimum value that depend on the ground reference speed $v_{sol\_ref\_n}$.

In the case at hand, this limited speed is denoted $v_{sol2\_n}$ and is chosen to be equal to the median of the set of values $\{v_{sol1\_n}, v_{sol\_ref\_n}+\Delta, v_{sol\_ref\_n}-\Delta\}$ where $\Delta$ is a predetermined value.

The value $\Delta$ has for example been chosen beforehand, via a simulation campaign, such that $v_{sol\_ref\_n}+\Delta$ is the maximum speed making it possible to perform a satisfactory landing.

The satisfactory landing criteria are for example those corresponding to the notion of "safe landing" in the landing standards, in particular standards AC120-28.

The main criteria that must not be exceeded are:

a—longitudinal landing upstream from a point on the runway 60 meters from the runway threshold;

b—longitudinal landing beyond the end of the landing zone lighting at 914 meters from the threshold;

c—lateral landing with the outer landing gear further than 21 meters from the center line of the runway, in the case of a 45 meter runway;

d—sink rate corresponding to a limit structural load;

e—roll angle such that the end of the wing touches the ground before the wheels;

f—lateral speed or sideslip angle corresponding to a limit structural load.

In a step 106, the application APP determines a landing guidance instruction as a function of the ground speed $v_{sol2\_n}$ corresponding to a safe ground speed.

Depending on the embodiments, the guidance instruction is applied by the automatic pilot or displayed on the pilot's viewing crosshairs.

If the flare conditions tested in step 103 are met, in step 107, the guidance instruction in the flare is determined by the application APP as a function of the ground speed $v_{sol1\_n}$, then applied by the automatic pilot or displayed on the pilot's viewing crosshairs ($v_{sol1\_n}$ is used here because when the flare is reached, $v_{sol2\_n}$ can no longer be computed because the hypothesis for that computation is that one is on a constant-slope trajectory, which is no longer the case during the flare).

At the end of steps 106 and 107, in step 108, the number n is incremented by 1.

If, in step 102, the radio altitude $h_n$ has been determined to be lower than the height H, step 109 is carried out.

The aircraft 2 is then situated in a radio altitude zone where it is no longer desirable to use $v_{sol1\_n}$ as input for the guidance algorithm, the risk related to the presence of an error on $v_{sol1\_n}$ or related to the absence of $v_{sol1\_n}$ becoming too critical.

A so-called inertial ground speed $v_{sol\_inert\_n}$ is used in place of the ground speed $v_{sol1\_n}$ provided by the IRS sensor 2.

The inertial ground speed $v_{sol\_inert\_n}$ is determined by incorporating accelerations provided by the AHRS between the moments $t_n H$ and $t_n$, for example using a hybridization algorithm between the accelerations $Acc_i$ and the speed $v_{sol1\_n^H}$ provided by the IRS sensor 2, where i is an integer between $n^H$ and n, $n^H$ being the index such that $t_n H$ is the last computation moment before the aircraft 2 drops below the radio altitude H. Since the integration duration is short, it is then accepted to compute the ground speed by incorporating accelerations provided by the AHRS 4, which are less precise than those of the IRS 2, but redundant.

A hybridization algorithm is for example described in FR 2,743,892 "Aircraft piloting assistance system using a head-up display".

Then, step 110 tests whether the flare conditions are met, as in step 103.

If the flare conditions tested in step 110 are not met, in step 111, a reference ground speed is then estimated, called $v_{sol\_ref\_n}v$ of the aircraft, as a function of the angle $\gamma$ between the glide path and the plane (X, Y) and as a function of the vertical speed of the aircraft $v_{z\_n}$.

In the case at hand: $v_{sol\_ref\_n} = v_{z\_n}/\tan(\gamma)$, where tan designates the "tangent" function.

In step 112, the ground speed $v_{sol\_inert\_n}$ is limited by a maximum value and a minimum value, which are functions of the reference ground speed $v_{sol\_ref\_n}$.

In the case at hand, this limited speed is denoted $v_{sol2\_n}$ and is chosen to be equal to the median of the set of values $\{v_{sol\_ref\_n}, v_{sol\_ref\_n}+\Delta, v_{sol\_ref\_n}-\Delta\}$ where $\Delta$ is a value predetermined in the manner previously indicated.

In step 113, the application APP determines a landing guidance instruction as a function of the ground speed $v_{sol2\_n}$ corresponding to a safe ground speed.

Depending on the embodiments, the guidance instruction is applied by the automatic pilot or displayed on the pilot's viewing crosshairs.

If the flare conditions tested in step 110 are met, in step 114 the guidance instruction in the flare is determined by the application APP as a function of the ground speed $v_{sol\_inert\_n}$, then applied by the automatic pilot or displayed in the pilot's viewing crosshairs.

At the end of steps 113 and 114, in step 115, the number n is incremented by 1.

The value of the angle $\gamma$ used in steps 104 and 111 is for example stored in a database onboard the aircraft. This value is typically in the interval [2°; 10°], preferably in the interval [2.5 to 3.5°].

Of course, in the case of landing, the slopes of the glide paths are negative.

In one embodiment, the value of the angle $\gamma$ is frozen at 3 degrees because that angle value is the value of most of the glide paths allowing landing guidance.

In the embodiment described above in reference to the figures, an IRS sensor 2 provided the ground speed and at least one AHRS 4 was used as primary reference sensor, for example as part of automatic landing or head-up guidance.

In one embodiment, a GNSS receiver is also used to verify that the IRS sensor 2 has no latent breakdown. That GNSS does not, however, provide the ground speed information used in the process 100.

In a second embodiment, for example for automatic landing or head-up guidance, a GNSS navigation receiver is used as a sensor 2 providing the ground speed (in place of the IRS 2). This GNSS receiver is for example duplicated to verify its integrity (i.e., lack of breakdown). The AHRS 4 is used as primary reference sensor.

The invention claimed is:

1. A method securing a ground speed used in an algorithm guiding landing of an aircraft above a flare portion, comprising the following steps:
   determining a ground speed of the aircraft, using an inertial sensor;
   determining, using a computer, at least one landing guidance instruction based on at least said determined ground speed of the aircraft;
   estimating a vertical speed of the aircraft using a reference system;
   during guidance along a glide path describing a given descent angle, limiting said determined ground speed of the aircraft as a function of the estimated vertical speed;
   wherein the guidance instruction being determined based on said limited ground speed;
   measuring a height of the aircraft; and
   comparing the measured height of the aircraft with a threshold height;
   wherein if the measured height is greater than the threshold height, the limitation of the ground speed comprises the limitation, as a function of the estimated vertical speed, of a ground speed of the aircraft determined as a function of measurements performed by a first sensor of the aircraft;
   wherein if the measured height is below the threshold height, the limitation of the ground speed comprises the limitation, as a function of the estimated vertical speed, of a ground speed of the aircraft determined as a function of acceleration measurements of the aircraft performed by a second sensor different from the first sensor since the threshold height has been crossed, excluding any measurement taken once the threshold height has been crossed by the first sensor separate from the second sensor, and further as a function of the ground speed of the aircraft as limited in a step for limiting a ground speed of the aircraft determined as a function of measurements performed by said first acceleration sensor before crossing the threshold height; and
   wherein the first sensor acts independently of the second sensor.

2. The method securing a ground speed used in an aircraft landing algorithm according to claim 1, wherein the ground speed is limited as a function of a ratio between said estimated vertical speed and $\tan(\gamma)$, where the angle $\gamma$ has a value comprised in the range between 2° and 10°.

3. The method securing a ground speed used in an aircraft landing algorithm according to claim 2, wherein the ground speed is limited as a function of a ratio between said estimated vertical speed and the tangent of the descent angle of the glide path.

4. The method securing a ground speed used in an aircraft landing algorithm according to claim 2, wherein said limited ground speed is equal to the median of the set comprising the determined ground speed, the result of the sum of said ratio and a first, positive constant, and the result of the sum of said ratio and a second, negative constant.

5. The method securing a ground speed used in an algorithm for guiding landing of an aircraft according to claim 1, wherein said measurements done by a first aircraft sensor comprise acceleration measurements.

6. The method securing a ground speed used in an aircraft landing algorithm according to claim 1, wherein the precision level of the determination of the aircraft's ground speed by the first sensor is higher than the precision level of the determination of the aircraft's ground speed by the second sensor, and
   wherein the aircraft further comprises a third sensor similar to the second sensor such that the accuracy of said aircraft acceleration measurements done by the second sensor is validated based on acceleration measurements done by the third sensor.

7. The method securing a ground speed used in an aircraft landing algorithm according to claim 1, wherein the ground speed is limited as a function of a ration between said estimated vertical speed and $\tan(\gamma)$, where the angle $\gamma$ has a value comprised in a range from 2.5 to 3.5°.

8. A computer program that can be installed in a landing guidance device of an aircraft, said program comprising instructions for carrying out the following steps for securing a ground speed used in an algorithm for guiding an aircraft above a flare portion when the program is run by a processor of said landing guidance device:
- determining a ground speed of the aircraft;
- using a computer to determine at least one landing guidance instruction based on at least said determined ground speed of the aircraft;
- estimating a vertical speed of the aircraft;
- during guidance along a glide path describing a given descent angle, limiting said determined ground speed of the aircraft as a function of the estimated vertical speed;
- wherein the guidance instruction being determined based on said limited ground speed;
- measuring a height of the aircraft; and
- comparing the measured height of the aircraft with a threshold height;
- wherein if the measured height is greater than the threshold height, the limitation of the ground speed comprises the limitation, as a function of the estimated vertical speed, of a ground speed of the aircraft determined as a function of measurements performed by a first sensor of the aircraft;
- wherein if the measured height is below the threshold height, the limitation of the ground speed comprises the limitation, as a function of the estimated vertical speed, of a ground speed of the aircraft determined as a function of acceleration measurements of the aircraft performed by a second sensor different from the first sensor since the threshold height has been crossed, excluding any measurement taken once the threshold height has been crossed by the first sensor separate from the second sensor, and further as a function of the ground speed of the aircraft as limited in a step for limiting a ground speed of the aircraft determined as a function of measurements performed by said first acceleration sensor before crossing the threshold height; and
- wherein the first sensor acts independently of the second sensor.

9. A landing guidance device for an aircraft, comprising:
- a ground speed sensor securing a ground speed of the aircraft and determining at least one landing guidance instruction above the flare portion as a function of said at least one determined ground speed;
- a vertical speed sensor estimating a vertical speed of the aircraft and, during guidance along a glide path describing a given descent angle, determining said determined aircraft ground speed and securing said determined ground speed of the aircraft by limiting it as a function of the estimated vertical speed;
- a processor determining the guidance instruction as a function of said limited ground speed; and
- a height sensor measuring a height of the aircraft and comparing the measured height of the aircraft with a threshold height;
- wherein if the measured height is greater than the threshold height, for limiting said ground speed by limiting, as a function of the estimated vertical speed, a ground speed of the aircraft determined as a function of measurements performed by a first sensor of the aircraft;
- wherein if the measured height is below the threshold height, for limiting the ground speed by limiting, as a function of the estimated vertical speed, a ground speed of the aircraft determined as a function of acceleration measurements of the aircraft performed by a second sensor different from the first sensor since the threshold height has been crossed, excluding any measurement taken once the threshold height has been crossed by the first sensor separate from the second sensor, and further as a function of the ground speed of the aircraft as limited by the device determined by limiting a ground speed of the aircraft determined as a function of measurements performed by said first acceleration sensor before crossing the threshold height; and
- wherein the first sensor acts independently of the second sensor.

10. The aircraft landing guidance device according to claim 9, further comprising a limiter limiting the ground speed as a function of a ratio between said estimated vertical speed and $\tan(\gamma)$, where the angle $\gamma$ has a value comprised in the range between 2° and 10°.

11. The aircraft landing guidance device according to claim 10, further comprising a second limiter limiting the ground speed as a function of a ratio between said estimated vertical speed and the tangent of the descent angle of the glide path.

12. The aircraft landing guidance device according to claim 10, wherein said limited ground speed is equal to the median of the set comprising the determined ground speed, the result of the sum of said ratio and a first, positive constant, and the result of the sum of said ratio and a second, negative constant.

13. The aircraft landing guidance device according to claim 9, wherein said measurements performed by the first sensor comprise acceleration measurements.

14. The aircraft landing guidance device according to claim 9, wherein the precision level of the determination of the aircraft's ground speed by the first sensor being higher than the precision level of the determination of the aircraft's ground speed by the second sensor, and the aircraft further comprising a third sensor similar to the second sensor, said device being suitable for validating the accuracy of said aircraft acceleration measurements done by the second sensor as a function of acceleration measurements done by the third sensor.

15. The aircraft landing guidance device according to claim 9, further comprising a limiter limiting the ground speed as a function of a ration between said estimated vertical speed and $\tan(\gamma)$, where the angle $\gamma$ has a value comprised in a range from 2.5 3.5°.

* * * * *